Figure 1:
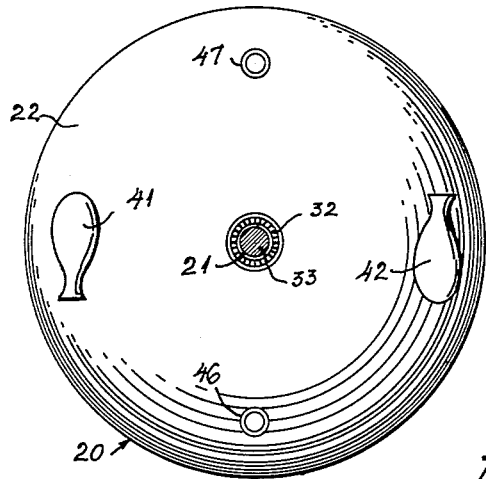

Aug. 10, 1965   J. N. MODESTI   3,199,809
CIRCULAR WING FLYING CRAFT
Filed Aug. 12, 1963   3 Sheets-Sheet 1

INVENTOR.
JAMES N. MODESTI
Polachek & Saulsbury
ATTORNEYS

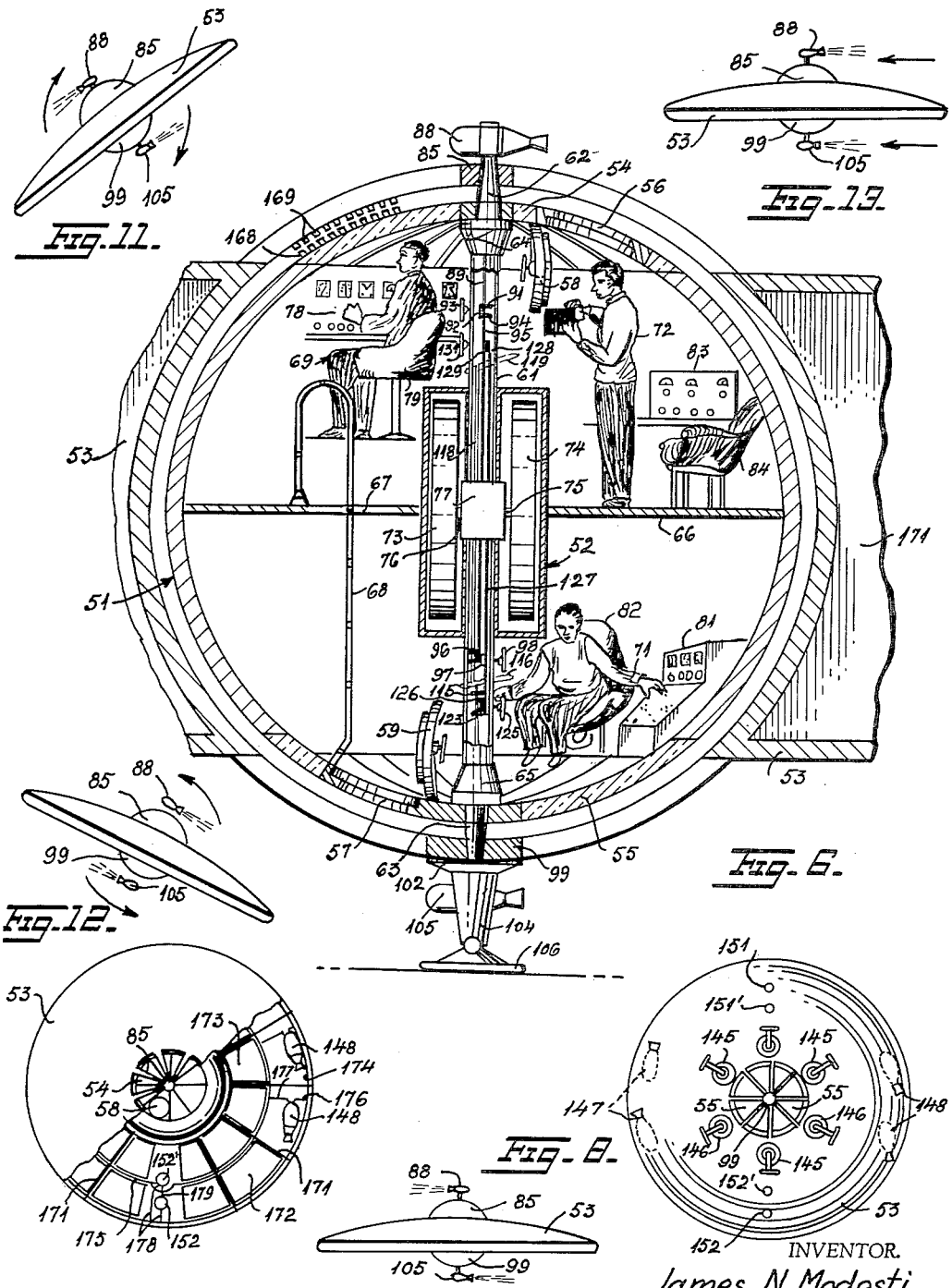

Aug. 10, 1965
J. N. MODESTI
3,199,809
CIRCULAR WING FLYING CRAFT
Filed Aug. 12, 1963
3 Sheets-Sheet 3
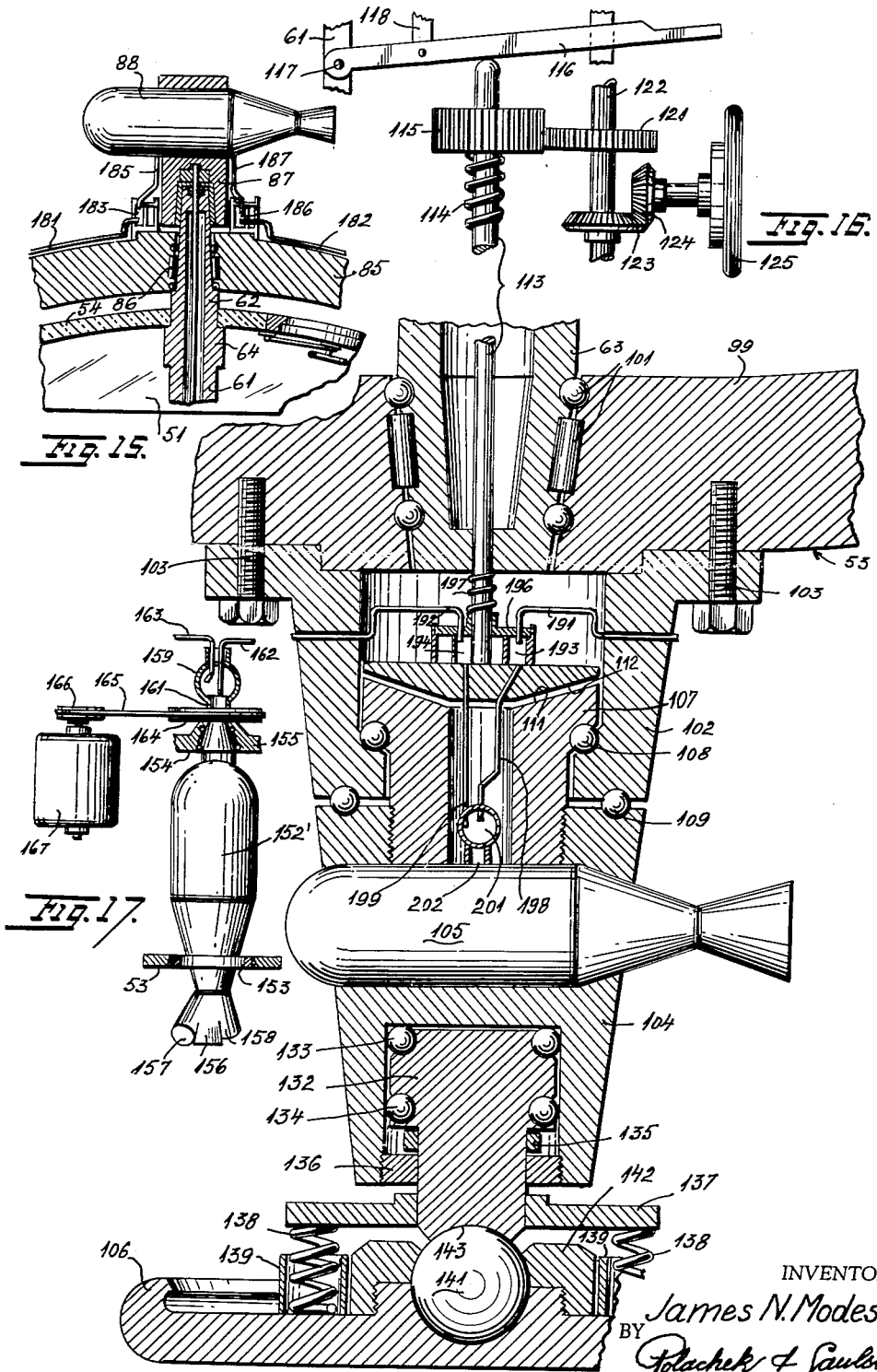
INVENTOR.
James N. Modesti
BY
Polachek & Saulsbury
ATTORNEYS.

United States Patent Office 3,199,809
Patented Aug. 10, 1965

3,199,809
CIRCULAR WING FLYING CRAFT
James N. Modesti, 914 W. 94th St., New York, N.Y.
Filed Aug. 12, 1963, Ser. No. 301,317
7 Claims. (Cl. 244—12)

This invention relates to experimental and manned circular wing flying craft.

It is the principal object of the present invention to provide a flying craft that can under its own propulsion be launched from the ground and maneuvered in any direction.

It is still another object of the invention to provide a flying craft of an experimental type that can be launched from a launching pole about which it will be spun by rocket motors and lifted by the rotative force of an airfoil shaped circular wing in conjunction with vertically extending rocket motors.

It is still another object of the invention to provide such a flying craft having a circular wing or airfoil that is spun about a compartment in which the personnel is housed and through the top and bottom of which observation may be made and wherein the circular foil, when the flying craft is on the ground preparatory to take off and upon landing, can be supported on a single pivot foot.

It is still another object of the invention to provide a flying craft having the immediately above object in mind, with rocket motors turnable upon the top and bottom of the flying craft independently of one another for steering the flying craft when in flight.

It is a further object of the invention to provide a flying craft that has a spinning circular wing or airfoil in which the fuel supply tanks will be disposed and spun so that the fuel will be forced into the rocket motors under pressure created by centrifugal action.

It is still a further object of the invention to provide a flying craft comprising a compartment having a vertically-extending pivot post and a circular wing or airfoil cross section pivoted upon the compartment and to the post, and spun by horizontally-extending rocket motors and adapted to be lifted by a rotating airfoil wing augmented by vertically-extending rocket motors, and in which certain of the vertically-extending motors are formed and adapted to be rotated by their jet action about their vertical axis and serve to drive electric generating means that may supply electric current into the flying craft, and electrically-operated gyratory rotated flywheel stabilizing means supported upon the pivot post in the center of the compartment, and supplied by the electric current from the rocket operated electric generator.

It is a still further object of the invention to provide a spinning type craft in which the velocity of spinning started upon the ground may be maintained when the craft is in flight.

It is still a further object of the invention to provide a manned flying craft of the spinning circular foil type operated by horizontally-extending spin rocket motors, vertically-extending thrust rocket motors, steerable top and bottom motors, with which the turning of the motors on and off controls the flight and direction of the craft and wherein this is effected from a simple control system and the actuation of simple off and on switches provided for the respective rocket motors to be turned off and on at the will of the pilot.

It is still another object of the invention to provide a flying craft operated by horizontally and vertically-extending rocket motors in which the body of the rocket motors will be enclosed within the circular foil with but the exhaust or firing cone protruding from the undersurface of the flying craft.

It is a still further object of the invention to provide a spinning wing flying craft with but a single pivot foot for take off and landing and further with a plurality of circumferentially spaced retractable landing gear wheels that can be used to support the craft upon the ground when it is not rotating and to slow down the spinning action upon landing.

Still further objects of the invention are to provide a spinning wing flying craft having the above objects in mind which is of simple construction, easy to assemble, easy to control, light in weight, compact, adapted for either experimental or manned use, which may utilize standard equipment such as rocket engines, well known fuel tanks, and instruments, and which is efficient and effective in use.

Figure 2:
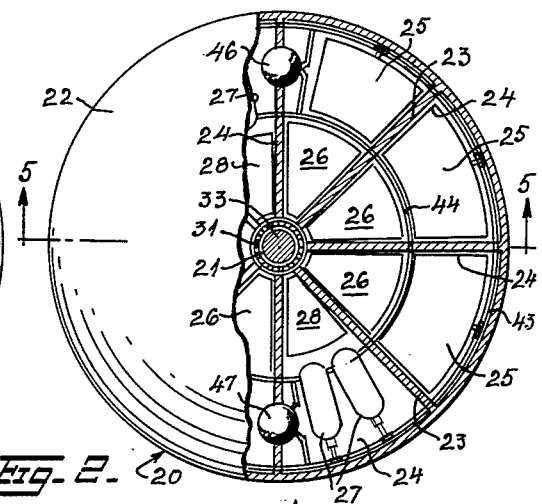
Figure 3:
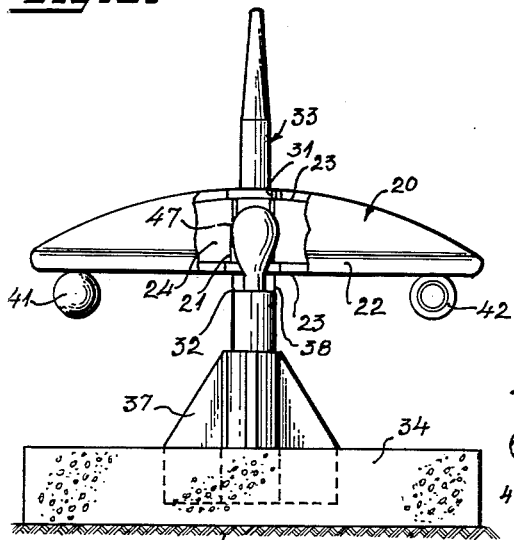
Figure 4:
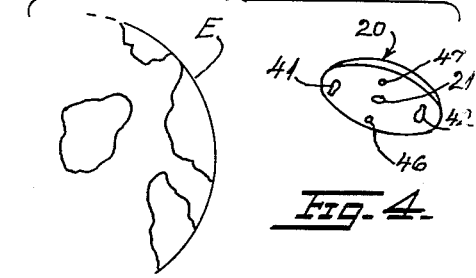
Figure 5:
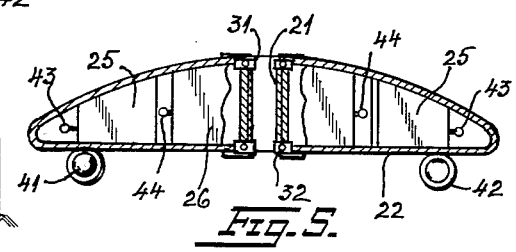
Figure 7:
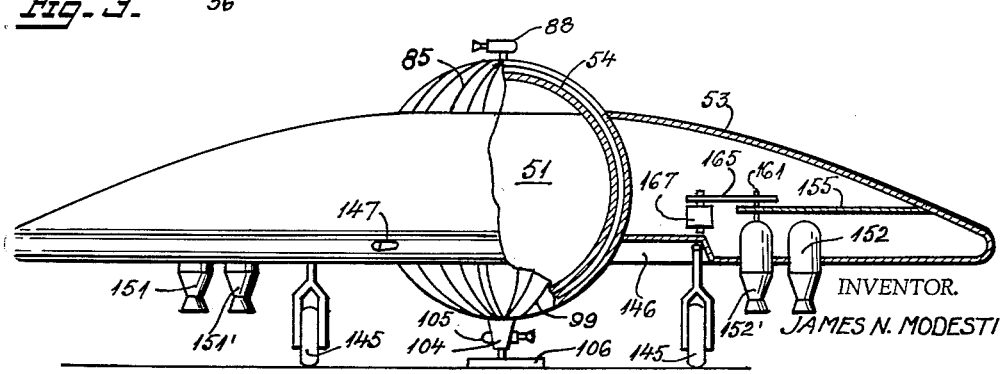

For a better understanding of the invention, reference is made to the following detailed description taken in connection with the accompanying drawing, in which FIGURE 1 is a bottom plan view of the experimental flying craft constructed according to one form of the invention, FIG. 2 is a fragmentary top plan view of the experimental flying craft broken away to show the interior construction of the same, the lifting jet rocket motors and the fuel compartments, FIG. 3 is an elevational view of the launching pole with the flying craft supported thereon preparatory to take off, FIG. 4 is an illustrative view of the flying craft in flight removed from the earth surface, FIG. 5 is a fragmentary elevational view of the flying craft broken away to show the central construction thereof, FIG. 6 is an enlarged fragmentary manned flying craft constructed according to a modified form of the invention, the view being in section to show the interior of the flying craft resting on the ground surface, FIG. 7 is an elevational view of the manned flying craft resting on the ground with the landing wheels extended to support the craft on the ground, portions of the craft being broken away to show the interior construction thereof, FIG. 8 is a bottom plan view of the manned flying craft showing the landing wheels retracted and the locations of the vertical lifting and the horizontally-extending spinning jet rocket motors, FIG. 9 is a fragmentary top plan view of the manned flying craft with one side of the craft broken away to show internal rockets within the outer disc, FIGS. 10, 11, 12 and 13 are illustrative views respectively showing the manned flying craft on the ground preparatory to take off, and being under control in flight by the guidance jet motors to level the ship from the left and from the right, and to move the ship horizontally, FIG. 14 is an enlarged vertical sectional view of the bottom of the manned flying craft and in particular of the take off and landing pivot foot with the lower steering jet motor being shown in elevation, FIG. 15 is an enlarged vertical sectional view of the top of the manned flying craft and in particular the upper steering jet motor mechanism, FIG. 16 is a fragmentary elevational view of a portion of the steering gear control mechanism, and FIG. 17 is an elevational view of one of the combined lifting and rotational electrical generator operating jet rockets.

Referring now particularly to FIGS. 1 to 5, the experimental flying craft will first be described. This craft is indicated generally at 20, and comprises generally a central sleeve 21 lying in the center of a disc-shaped wing or foil of airfoil cross section 22 that extends outwardly from the central sleeve over internal radially-extending ribs 23 providing thereby the outer surface of the foil 22. Between the ribs 23, there are provided triangular-shaped compartments 24 for housing bulk liquid fuel and oxygen gas tanks 25 and 26. In certain other compartments, there are located pressurized liquid fuel bottles 27 that are pressurized to supply their contents. All of these tanks can be of any desired shape but are preferably the same size in the different compartments to contain the same volume of the liquid fuel and oxygen in order to maintain a balanced weight throughout all of the compartments of the flying craft. Guidance control and pump valve equipment 28 are provided in opposing bottle compartments 24. They will be particularly retained and braced against great stress that will be set up by centrifugal action.

On the upper end of the central sleeve 21 is a ball bearing assembly 31 and at the bottom end of the central sleeve is a ball bearing assembly 32. The central sleeve 21 and the ball bearing assemblies 31 and 32 receive a launching pole 33 partially tapered and on which the flying craft is spun to assist its take off. This launching pole 33 is embedded at its lower end in a large concrete structure 34 provided on ground surface 36 and is adequately braced to and within this concrete structure 34 by embedded radially-extending side ribs 37. The circular foil flying craft when lying about the launching pole is supported upon a shoulder 38 by the bottom ball bearing assembly 32.

Suspended from the underside of the circular foil 22 at diametrically opposite sides thereof, to effect the spinning of the flying craft on the launching pole 33 and in flight, FIG. 4, are horizontally-extending liquid fuel and oxygen supplied jet rocket motors 41 and 42, that lie parallel to each other, equally radially spaced from the center of the craft and which extend tangentially to effect a spinning force about the center of the flying craft to create a gyroscopic effect so as to keep the craft in balance.

These jet rocket motors 41 and 42 are supplied with liquid fuel and oxygen from any of the fuel and oxygen tanks and bottles in the triangular-shaped compartments 24 by means of suction pumps, as well as by centrifugal action. The fuel and oxygen tanks 25 and 26 and bottles 27 are respectively connected at their outer ends by respective supply pipes 43 and 44 to the jet motors or in any other suitable manner whereby the fuel and oxygen will be supplied to these spinning motors from the tanks under the action of centrifugal force because of their location, in the flying craft. Before the spinning of the flying craft and centrifugal action has been obtained, the pressurized fuel bottles 27 may supply the fuel under pressure along with oxygen gas from the tanks to these horizontally-extending rocket motors 41 and 42. A fuel and oxygen supply system including suitably located pumps and valves will regulate and control the selection of supply sources to be used for the different jet motors, the horizontal ones and the vertical ones soon to be mentioned. However, it is to be understood that use will be made of the centrifugal action to supply the rocket motors with the liquid fuel and oxygen when the high spinning speeds are reached and demand is great.

After the flying craft has built up rotational speed on the launching pole 33, diametrically-opposite vertical thrust jet rocket motors 46 and 47 are opened up and will immediately carry the flying craft into the air. The fuel and oxygen supply to these vertical motors can be derived from any of the fuel and oxygen tanks, through any of the piping and by the operation of selected valves forming a part of the system. Such valves and the controls therefore may be of any desired conventional type, such for example, as described in U.S. Patent No. 2,939,648.

The guidance control equipment 28 may then be operated to turn off the horizontal motors 41 and 42 and the upward thrust of the flying craft can be maintained in its upward flight by the vertical thrust rocket motors 46 and 47. If the flying craft is to be left without vertical thrust, the control equipment will operate to turn off the vertically thrust motors. If there is drifting, the vertical and horizontal motors can be turned on by instruments forming part of the control equipment. Such instruments may take the form of any well known remote control switch operating equipment, such for example as that shown in U.S. Patent numbers 2,939,020 or 2,930,955. The vertical and horizontal rocket motors 46 and 47 and 41 and 42 thus can be started and stopped as desired by the control equipment and as well. The flying craft can be steered and navigated from the starting and stopping of one or both of the vertical motors to tilt the disc as desired from the ground or from other craft by any suitable conventional control radio means, such, for example, as that shown in U.S. Patent No. 2,939,020.

The craft will have a large supply of fuel and will be permitted to maneuver freely under instrument control according to the pattern of the guidance control equipment and from instruments upon the ground, or other craft. With all of the rocket motors turned off, the craft can drift toward the ground and be returned to land again, by the spinning motors 41 and 42.

Referring now particularly to FIGS. 6, 7, 8 and 9, the manned flying craft will be described. There is provided a central compartment 51, spherical in shape, which is held against turning by gyroscopic mechanism 52 and about which a disc or circular foil 53 rotates at high speed.

The inner spherical compartment 51 is large enough to comfortably house the pilots and is completely enclosed. The top and bottom of the compartment 51 are glassed as indicated respectively at 54 and 55 and these glass enclosures respectively have in them trap door openings 56 and 57 for entry into and escape from the compartment 51. They are closed respectively by lock hatch doors 58 and 59.

A central hollow pivot post 61 extends vertically from the bottom of the compartment to the top and has top and bottom stub axles 62 and 63 that respectively extend through the top and bottom of the compartment 51 from respective shoulder enlargements 64 and 65 engaging the inner wall surface of the compartment and fixed thereto against rotation.

The compartment 51 is divided by a floor 66 to provide upper and lower spaces for the pilot, navigator and co-pilot. They can pass through an opening 67 in the floor and over a ladder 68 to go between the spaces. The pilot, copilot and navigator are respectively indicated at 69, 71 and 72.

There is a dual control so that each pilot can control the ship from either the upper or lower space of the compartment 51. The pilot in the upper space will assume control on take off and ascent while the pilot in the lower space may assume control on landing. They make their observations respectively through the respective top and bottom glass enclosures 54 and 55, these glass enclosures providing the window domes for the craft. The entire compartment 51, with the hatch doors closed, is air tight and may be pressurized by the usual equipment provided on aircraft for this purpose.

In order to keep the compartment 51 from turning while the disc-shaped airfoil 53 is rotated at high speed thereabouts in a manner to be described hereinafter, the vertical pivot post 61 supports the gyroscopic mechanism 52 at the center point of the compartment. This mechanism 52 has two electric motor flywheels 73 and 74, the motor being incorporated within the flywheel, powered by electric current supplied by rocket driven generators to be later mentioned and supported respectively upon axles 75 and 76 extending outwardly from a mounting sleeve bracket 77 fixed to the vertical post 61 at the central location within the compartment and of the flying craft. These flywheels are respectively driven in same directions at very high speed and will give a gyroscopic action about an axis perpendicular to that of the rotating foil to keep the canned compartment 51 from revolving with the outer circular foil 53 as the foil 53 is spun. Stabilization may be augmented and tumbling prevented in any conventional manner as by means of a rate gyro mechanism as disclosed in U.S. Patent No. 2,939,648.

The pilot 69 in the upper space has a control panel 78 accessible to him from his seat 79 and on which the various instruments used in flying of the craft are located. The landing pilot is provided with a somewhat similar control panel 81 that he can operate from his chair 82. Both of these pilots also have accessible to them hand steering wheel control mechanism which will be later described in detail. The navigator 72 has a data panel 83 adjacent to his chair 84 and such hand instruments as he may need.

The disc-shaped airfoil 53 has an open top hub and open spider-like structure 85 through which the stub axle 62 of the hollow post 61 extends, FIGS. 6 and 15. The stub axle 62 is generally tapered to keep the structure 85 spaced from the outer surface of the spherical compartment 51 and has a thrust ball and roller bearing assembly 86 to provide substantially free rotation with little friction tending to rotate the compartment with the disc airfoil 53.

On the still outer end of the stub axle 62, there is connected for turning movement a mounting cap 87 that supports a horizontally-extending top steering guidance rocket engine 88. This cap rocket engine can be adjusted angularly in a horizontal plane by a shaft 89 extending downwardly through the pivot post 61. This shaft 89 has a bevel gear 91 which is turned by a gear 92 and a hand wheel 93 on the post 61 that is readily accessible to the pilot 69. A gear 94 opposing the gear 91, meshes with the gear 92 and a shaft 95 depends downwardly therefrom through the pivot post and has a bevel gear 96 that can be turned by a gear 97 and a hand wheel 98 adjacent to the copilot 71. Thus, through this gearing the copilot as well as the pilot can turn the top steering rocket 88.

At the bottom of the craft and beneath the bottom glass enclosure 55 of the compartment 51 is a spider hub construction 99 to which the tapered bottom stub axle 63 depends and is connected therewith through a combined roller and ball bearing assembly 101, similar to the upper roller and ball bearing assembly 86 on the top stub axle 62, allowing thereby free rotation of the circular foil 53 about the pivot post 61 and the manned compartment 51, FIGS. 6 and 14. Shouldered to the underside of the bottom spider hub structure 99 is a depending sleeve bearing bracket 102 and fixed by means of fastening bolts 103. Steerably connected to the bearing block 102, in a manner to be set forth more in detail, is a combined steering rocket and landing foot supporting member 104 that carries a horizontally-extending bottom steering guidance rocket engine 105 and a landing foot assembly 106. This supporting member 104 has an upwardly-extending projection 107 fitted in the bracket 102 (FIG. 14) and is supported against downward displacement therefrom by ball bearings 108 while the support member itself is held against the lower end of the bracket 102 by the ball bearings 109 to offset the upward thrust of the support member 104 while the craft is supported on its landing foot 106 and upon the craft being landed. The upwardly-extending projection 107 has a conical clutch face 111 on its upper end which can be engaged by a conical movable clutch member 112 that is fixed to the lower end of a vertically-adjustable operating rod 113 extending upwardly through the stub axle 63. A compression spring 114 surrounds the operating rod 113 and reacts between an operating gear 115, FIG. 16, fixed to the upper end of the rod 113 and the pivot post 61 to normally maintain the clutch member 112 out of engagement with the clutch face 111 allowing the support member 104 with the steering rocket 105 and landing foot 106 to be free and remain still while the circular foil 53 is rotated at high speeds about the pivot post 61 and compartment 51.

When it is desired to use the bottom steering rocket 105 the clutch member 112 is depressed through engagement with the upper end of the operating rod by a hand lever 116 accessible to the copilot 71 and pivoted at one end to one side of the pivot post 61 at 117 and extends outwardly through the opposite side of the pivot post. Extending upwardly from the hand lever 116 and through the pivot post 61 is a connecting rod 118 that connects with another hand lever 119 which is accessible to the pilot 69 or navigator 72 whereby they may also depress the clutch 112 to operate the bottom steering rocket 105.

With the clutch member 112 in engagement with the clutch surface 111 mechanism is provided to effect the turning of the rocket support member 104 and the rocket 105 and which includes a gear 121 fixed to an operating shaft 122 and extending upwardly through the pivot post 61 and slidable upon and in mesh with the gear 115 fixed to the clutch operating rod 113. A bevel gear 123 is fixed to the operating shaft 122 and the gear and shaft are turned by a bevel gear 124 meshing with the bevel gear 123 and a hand wheel 125 accessible to the copilot 71. Conventional reduction gearing may be interposed in any part of the gear train to reduce torque imparted to wheel 125, if necessary.

In order that the pilot can likewise effect the steering of the bottom rocket 105, a bevel gear 126 engages the gear 124 and is driven by a vertically-extending rod 127 that extends upwardly through the pivot post 61 and has at its upper end a bevel gear 128 and is operated by a bevel gear 129 and a hand wheel 131 that is easily accessible to the pilot.

It should now be apparent from this mechanism that the top and bottom steering rockets 88 and 105 can be turned independently of one another and directed in different directions with the bottom steering rocket 105 permitted when desired to turn freely as when use is made of the landing foot 106.

The lower end of the bottom rocket support 104 is hollowed and receives a bearing block 132 which has upper and lower ball bearing assemblies 133 and 134 and is retained within the supporting member 104 by a collar 135 and a retaining plate 136 threaded into the bottom end of the support member 104. Tightly secured to the projecting lower end of the bearing block 132 is a circular plate 137 from which compression springs 138 depend, the same being fixed thereto at angularly spaced positions thereabout. The landing foot 106 is connected to the lower ends of the springs and has sleeves 139 that surround the springs 138 to hold the coils thereof in axial alignment with one another for maximum spring action as upon landing the craft upon the foot 106. The foot assembly can rotate about its vertical axis upon the ball bearings 133 and 134 with the thrust being taken up by the ball bearings 133, but to permit the foot 106 to tilt and level itself with the ground surface, a universal ball 141 is retained upon the foot by a threaded retaining cap 142 and engages with a concaved surface 143 provided on the lower projecting end of the bearing block 132.

To further support the craft upon the ground, and which may come into play on take off and landing, are six circumferentially-spaced retractable landing wheels 145 that can be retracted into wells 146 in the bottom surface of the circular foil 53, FIGS. 7 and 8. When the craft is on the ground it will accordingly be supported not only by the landing pivot foot assembly 106 but by the retractable landing gear wheels 145. These landing wheels 145 are used on take off up to a predetermined spinning speed of the circular foil 53 and until such time as the gyroscopic action has come into effect to balance the craft upon the pivot foot assembly 106. Upon landing the craft the landing wheels 145 are lowered after the craft has landed upon the landing pivot foot assembly 106 and after the speed of rotation of the circular foil 53 has been reduced sufficiently so that the wheels 145 can be operated upon the ground without rupture or great wear. Under conditions where the landing surface is smooth, the wheels can be lowered for the initial landing. Any appropriate and well known landing gear operating mechanism contained within the disc and remotely controlled from the cabin in any conventional manner, as by radio may be used to extend and retract the landing gear wheels.

Within the outer periphery of the disc-shaped foil 53 and at directly opposite sides thereof are respectively installed pairs of tandemly arranged horizontally-extending rocket motors 147 and 148 that have their discharge nozzle ends extending through the bottom surface of the foil 53 to exhaust into the atmosphere and spin the circular foil 53. By the rocket motors 147 and 148 lying primarily within the circular foil 53 the resistance to the rotation of the foil 53 is greatly reduced.

These horizontal rocket motors 147 and 148 burn liquid fuel and oxygen and when started will cause the circular foil 53 to be roated and spun at high speed and when sufficient speed has been reached the craft can be balanced upon its pivot foot assembly 106 and the landing gear wheels 145 retracted. The disc may be rotated by any desired manual means, either from the exterior or within the cabin, until the trip switches 169 are actuated to start the motors. The craft is then made ready for its vertical ascent. The discharge nozzle ends of the rocket motor that protrude from the underside of the circular foil 53 are preferably inclined slightly downwardly and pointed slightly radially inwardly from the tangent. These nozzles thus arranged will give a slight lifting effect sufficiently to hold the sides of the disc foil upwardly upon the pivot foot assembly and allow the landing gear to be retracted.

With the circular foil 53 spinning upon the pivot foot assembly 106 and the landing wheels 145 retracted, the primary vertical lift is effected by pairs of vertically-extending rocket motors 151, 151' and 152, 152'. These vertical rocket motors are also mounted primarily within the circular foil 53 and have their discharge nozzles protruding downwardly through and from the undersurface of the circular foil 53 and will have only slight resistance to the turning of the foil 53. While the horizontal rocket motors are slightly angled off their centers, these vertical motors are kept directly upon their centers so that there will be a true vertical thrust made from them. These vertical rocket motors 151, 151' and 152, 152' of each pair are radially-spaced from one another within the pairs and the pairs of rocket motors are respectively disposed on the opposite sides of the disc foil one hundred and eighty degrees from one another and angled ninety degrees from the respective pairs of horizontal motors 147, 148 and circumferentially-spaced between them as best viewed in FIG. 8.

The inner vertical rockets 151' and 152' of each pair are mounted within the circular foil 53 to rotate about its axis at high speed, FIG. 17. These rocket motors are respectively mounted in a horizontal guide bearing assembly 153 at their discharge end and at their upper end in a combined vertical thrust and horizontal bearing assembly 154 at the upper part of the rocket and lying within a horizontally-extending partition wall 155. Thus, the rocket motors can rotate within these bearings.

The discharge end of the vertically-extending rocket motor 152' has a central fire opening 156 and two fire openings 157 and 158 radially and angularly offset from the central opening so as to effect upon the rocket motors being fired the rotation of the rocket motor 152' about its axis. In order to make possible the supply of fuel to the rocket motor while it is under rotation an inverted cup-shaped mixing chamber 159 receives a nose supply projection 161 for rotation therein. The mixing chamber is supplied with fuel and oxygen by respective branch pipes 162 and 163.

The projection 161 also carries a large pulley 164 from which a pulley belt 165 extends to drive pulley 166 of an electric generator 167 that will supply electric current to the motor driven flywheels 73 and 74 of the gyroscopic mechanism 52, and to the various auxiliary and control equipment requiring the same for its operation. Thus are provided two such rockets 151' and 152' and two such generators 167 for the entire craft.

On the compartment wall 51 above the pilot 69 is a plurality of projections 168, ten in number, corresponding respectively to the respective rocket motors used in the operation of this craft. On the spider web structure 85 are a series of corresponding depending double acting one way conventional trip switches 169 that can be respectively operated by the extending of the projections 168. These switches will be respectively connected into the electric control system to turn on and off the rocket motors at the will of the pilot 69 from his panel 78, or the co-pilot from his control panel 81. Both of the control panels 78 and 81, as well as the navigator's panel 83, may have instruments from which workings of the craft are readily determined.

The circular foil 53 is divided into compartments by radially-extending ribs 171 and they are of equal size and in which fuel and oxygen containing tanks 172 and 173 are disposed and which are in turn of equal size and kept supplied with an equal weight of fuel and oxygen to maintain and keep the craft in balance at all times. The horizontal and vertical motors are supplied respectively, as best shown diagrammatically in FIG. 9, by circular pipe lines 174 and 175 connected with the respective fuel and oxygen tanks 172 and 173 at their outer peripheries so that with the circular foil 53 turning at a high rate of speed, the fuel and oxygen will be delivered to the rocket motors under pressure from centrifugal force and the thrust of the liquid and oxygen to the outer periphery of the respective tanks. Branch pipes 176 and 177 lead from the respective circular pipe lines to supply the respective horizontal rocket motors 147 and 148 while branch pipes 178 and 179 serve to supply the vertical rocket motors 151, 151', 152 and 152' leading from the respective circular pipe lines 174 and 175.

The top steering rocket motor is supplied with fuel and oxygen through branch pipes 181 and 182, FIG. 15 that will lead from the respective circular pipe lines 174 and 175. The branch pipe 181 leads to an outer annular chamber 183 that is closed by an annular turnable plate 184. A pipe 185 is carried by the rocket motor 88 and depends through the turnable plate 184 into the annular fuel supply chamber 183.

Concentric with the annular chamber 183 is an inner annular chamber 186 that is also closed by the turnable plate 184 for the supply of oxygen to a pipe 187 leading from the chamber 186 through the plate 184 to the rocket motor 88. In this manner the rocket motor 88 is supplied with fuel and oxygen and yet permitted to be turned to steer the craft and at the same time permitting high speed rotation of the circular foil 53 and the hub structure 85 relative to the rocket motor 88.

The bottom steering rocket motor 105 is similarly supplied with fuel and oxygen from branch pipes 191 and 192 leading respectively from respective circular pipe lines 174 and 175 to respective concentric annular outer and inner chambers 193 and 194 and closed by a turnable cover plate 196 downwardly through which operating rod 113 for the clutch part 112 extends. The cover plate 196 is retained over the chambers 194 by a compression spring 197 reacting against the underface of the stub axle 63 of the pivot post 61. Pipes 198, 199 lead respectively from the respective annular chambers 193 and 194 through the clutch member 112 and to an inverted cup-shaped mixing chamber 201 with which an inlet supply member 202 on the rocket motor 105 is journalled. In this manner the bottom steering rocket motor 105 may be supplied without interference upon the turning of the circular foil 53 and the depending bracket 102 at high speed relative to the support member 104 and the rocket motor 105 that is carried by it. Conventional fuel pumps (not shown) may be employed to supply fuel to rocket motors 88 and 105, although fuel may flow to bottom rocket motor 105 by gravity.

The craft when in flight can be handled by the steerable top and bottom rocket motors 88 and 105 that extend horizontally and in a manner best illustrated in the diagrammatic FIGS. 10, 11, 12 and 13. These steering rocket motors 88 and 105 are carried by the stationary compartment 51 and are unaffected by the circular foil 53. With the rocket motors 88 and 105 extending in opposite side directions, and they can be turned through three hundred and sixty degrees to be operable in any radial plane, by assuming they are both in the same radial plane, the jet action will be effected as shown in FIG. 11 to level the craft to the right to be in a horizontal position as it is on the ground and illustrated in FIG. 10, or with the top and bottom rocket motors 88 and 105 reversed, the craft can be leveled to the left, from the position shown in FIG. 12 to the horizontal position shown in FIG. 10. With the craft in the horizontal position in flight and it is desired to move the craft to the left as viewed in FIG. 13, the rocket motors 88 and 105 are extended in the same direction and operated to move the craft to the left. If the rocket motors are turned one hundred and eighty degrees from the position illustrated in FIG. 13 the craft can be moved to the right. With the steering rocket motors 88 and 105 respectively angled out of a common radial plane, a combination of or resultant vectorial movements can be simultaneously effected upon the craft.

It should now be apparent that there has been provided both an experimental and manned flying craft that while having a central body retained against rotation and that may be adapted to house the personnel of the craft, has a rotating circular foil that is rotated and at high speed by rocket motors to place the craft in a state of stabilization resulting from gyroscope action and be lifted by vertical rocket motors disposed in the circular foil and sweeping the underside of the craft to give vertical thrust to the craft.

It should be further apparent that use has been made of pressures given to the liquid fuel and oxygen by centrifugal action to supply the rocket motors. It should be still further apparent that adequate means has been provided to steer the craft.

While various changes may be made in the detailed construction, it should be understood that such changes shall be within the spirit and scope of the present invention as defined by the appended claims.

What is claimed is:

1. A flying craft comprising a central body and a rotatable circular disc-like airfoil shaped wing journalled upon the central body, horizontally-extending rocket motors respectively carried on the respective opposite sides of the circular foil and extending substantially tangentially thereto and serving to spin the circular wing upon the central body to provide gyroscopic action upon the flying craft, and vertically-extending rocket motors respectively disposed on respective opposite sides of the circular wing to discharge gases downwardly to provide the lift of the flying craft upon the gyroscopic action having been effected, and means for supplying combustion fuel and gas to said rocket motors.

2. A flying craft as defined in claim 1, wherein said circular wing has peripherally arranged compartments, said fuel and gas supply means include fuel and oxygen supply tanks symmetrically formed alike and symmetrically disposed in said compartments in such a manner as to permit balance of the craft when the circular wing with the tanks is spun about the central body, and supply lines lead from said fuel and gas tanks from their outer peripheries to utilize the centrifugal action developed by the wing for the forcing of the fuel and oxygen gas to the rocket motors.

3. A flying craft as defined in claim 1, wherein said central body is provided with a central opening extending from the underside of the craft through the upper side thereof for the purpose of receiving a launching pole from which the craft upon being powered by its rocket motors can be launched for vertical ascent.

4. A flying craft as defined in claim 1, wherein said central body comprises a compartment adapted to be manned with personnel, said compartment having axles extending from the top and bottom and axially aligned with one another, and said circular wing has top and bottom spider hub structures receiving said axles for the circular wing to rotate thereabout, and means for restraining said central body against rotation while said circular wing is being spun thereabout.

5. A flying craft as defined in claim 4, wherein said central body further includes a pivot post extending from the top to the bottom of the compartment to support the compartment and having said axles integrally formed thereon, and said central body rotation restraining means including electrically driven flywheels carried by said pivot post centrally of the compartment and adapted for rotation and to provide gyroscopic stabilizing action.

6. A flying craft as defined in claim 1, including a solitary pivot landing foot structure depending from the center of the circular wing, said landing foot structure including a bracket fixed to said circular wing, a foot supporting member pivotally connected to the depending bracket and a landing foot, and means for universally and rotatably connecting said landing foot to the support member.

7. A flying craft as defined in claim 1, including a pivot landing foot structure depending centrally from the bottom center of said circular wing, and a series of retractable landing gear wheels circumferentially spaced with respect to one another and disposed in the bottom of the circular wing radially removed from and about the landing gear pivot and serving to support the craft while the craft is lying idle upon the ground and to reduce the spinning of the circular wing about the landing pivot foot upon the craft being landed.

References Cited by the Examiner

UNITED STATES PATENTS 2,939,648    7/60    Fleissner _____ 244—12

FOREIGN PATENTS 533,751    9/55    Italy.
535,469    11/55    Italy.
547,021    8/56    Italy.

MILTON BUCHLER, *Primary Examiner.*

FERGUS S. MIDDLETON, *Examiner.*